(12) United States Patent
Haines (10) Patent No.: US 11,958,700 B2
(45) Date of Patent: Apr. 16, 2024

(54) AUTOMATED MAIL SORTING SYSTEM AND METHOD

(71) Applicant: Robert Haines, Hastings, MN (US)

(72) Inventor: Robert Haines, Hastings, MN (US)

(73) Assignee: Robert Haines, Hastings, MN (US)

( * ) Notice: Subject to any disclaimer, the term of this patent is extended or adjusted under 35 U.S.C. 154(b) by 0 days.

(21) Appl. No.: 17/807,055

(22) Filed: Jun. 15, 2022

(65) Prior Publication Data

US 2022/0402707 A1 Dec. 22, 2022

Related U.S. Application Data

(60) Provisional application No. 63/213,094, filed on Jun. 21, 2021.

(51) Int. Cl.
*B65G 57/16* (2006.01)
*B07C 3/00* (2006.01)
*B07C 3/08* (2006.01)

(52) U.S. Cl.
CPC ............ *B65G 57/165* (2013.01); *B07C 3/008* (2013.01); *B07C 3/08* (2013.01); *B65G 2201/0258* (2013.01)

(58) Field of Classification Search
CPC .......... B65G 57/165; B65G 2201/0258; B07C 3/008; B07C 3/08
See application file for complete search history.

(56) References Cited

U.S. PATENT DOCUMENTS 4,573,369 A * 3/1986 Horn ....................... F16H 19/06
74/110
5,485,771 A * 1/1996 Brennan ............... B23Q 1/0045
82/1.11
5,720,421 A * 2/1998 Gentile ................. B21D 43/09
226/35
7,381,026 B1 6/2008 Power et al.
10,399,773 B2 * 9/2019 Grosse ................. B65G 1/0457

FOREIGN PATENT DOCUMENTS

| CN | 201516417 | 6/2010 |
| CN | 110721916 | 1/2020 |
| CN | 112845109 | 5/2021 |
| JP | 2007-061797 | 3/2007 |
| JP | 2013-170063 | 9/2013 |

OTHER PUBLICATIONS

International Search Report and Written Opinion corresponding to PCT/US2022/033641, dated Oct. 13, 2022.

* cited by examiner

*Primary Examiner* — Lynn E Schwenning
(74) *Attorney, Agent, or Firm* — Husch Blackwell LLP (57) ABSTRACT

An automated mail sorting system configured to position individual pieces of mail in one of a plurality of nested postal totes, including a denesting assembly configured to squeeze an upper portion of a postal tote of a plurality of nested postal totes to ease in separation of the postal tote from the plurality of nested postal totes, a traverse assembly configured to enable lifting of the postal tote from the plurality of nested postal totes and to transport the postal tote along a lateral distance, and a stacker assembly configured to receive the postal tote from the traverse assembly and to transport the postal tote past a feeder assembly for the positioning of individual pieces of mail within the postal tote.

19 Claims, 12 Drawing Sheets

AUTOMATED MAIL SORTING SYSTEM AND METHOD

RELATED APPLICATION INFORMATION

This application claims the benefit of U.S. Provisional Application No. 63/213,094 (filed Jun. 21, 2021, the contents of which are fully incorporated herein by reference.

TECHNICAL FIELD

The present technology is generally related to automated mail sorting systems and methods, and more particularly to a mail sorting system and method incorporating an adaptable friction feeder configured to sort and load mail into one or more nestable postal totes for ease in handling.

BACKGROUND

Direct marketing is a form of communicating an offer, where the specialized (direct marketing company) communicates directly with a pre-selected customer and supplies a method for a direct response. Typical response channels include toll-free telephone numbers, reply cards, reply forms to be sent in an envelope, websites and email addresses. By contrast, conventional advertising is of a general mass-message (undirected) nature, typically including information of where the product or service can be purchased.

Direct marketing is attractive to many marketers because its results, positive or otherwise, can be measured directly. For example, if a marketer sends out 1,000 solicitations by mail and 100 respond to the promotion, the marketer can say with confidence that the campaign led directly to a 10% conversion. This metric is known as the 'response rate', and it is one of many clearly quantifiable success metrics employed by direct marketers. In contrast, general advertising uses indirect measurements, such as awareness or engagement, since there is no direct response from a consumer. Measurement of results is a fundamental element in successful direct marketing.

One of the other significant benefits of direct marketing is that it enables promoting products or services that might not be known to consumers. Products or services with a sound value proposition, matched with an attractive offer, supported with effective communication, delivered through a suitable direct marketing channel and targeting the relevant customer segment can result in a very effective cost of acquisition. Relative to other channels of distribution (say retailing) direct marketing as a practice principally relies on the proposition, offer, communication, choice of channel and the target customer and so less dependent on the brand strength. Despite the proven ability of direct marketing to generate measurable results, most companies continue to use general or branding advertising to market their products or services.

Although direct marketing has proven itself to be an effective method of marketing, the labor involved in such marketing efforts can be costly. In particular, direct marketing involves a significant amount of repetitive manual labor, in retrieving printed materials (e.g., individual pieces of mail) for positioning in postal totes. The present disclosure addresses these concerns.

SUMMARY OF THE DISCLOSURE

Embodiments of the present disclosure provide an automated mail sorting system configured to receive individual pieces of mail (e.g., direct mail advertisements, flyers, envelopes, catalogs, etc.) for sorting and/or otherwise organizing the individual pieces of mail into distinct groups contained in one or more postal service bins for ease in mailing.

One embodiment of the present disclosure provides an automated mail sorting system configured to position individual pieces of mail in one of a plurality of nested postal totes, the automated mail sorting system, including a denesting assembly including one or more push contacts configured to selectively actuate between a neutral position and a denesting position, wherein in the denesting position the one or more push contacts squeeze an upper portion of a postal tote of a plurality of nested postal totes to ease in separation of the postal tote from the plurality of nested postal totes, a traverse assembly including one or more suction cups configured to selectively adhere to a surface of the postal tote to enable lifting of the postal tote from the plurality of nested postal totes, the traverse assembly further including a carriage configured to transport the postal tote along a lateral distance, and a stacker assembly including a tray configured to receive the postal tote from the traverse assembly, and a carriage configured to transport the postal tote past a feeder assembly for the positioning of individual pieces of mail within the postal tote.

In one embodiment, the system further includes one or more roller assemblies configured to transport a plurality of nested postal totes to at least one of a lift assembly or the denesting assembly. In one embodiment, the system further includes one or more lift assembly configured to vertically lift a plurality of nested postal totes to a desired height for access by the denesting assembly. In one embodiment, the system further includes a pusher assembly configured to transport the postal tote from the stacker assembly to a conveyor assembly for further processing.

In one embodiment, at least one of the denesting assembly, transfers assembly or stacker assembly includes a motor with rotary encoding capabilities. In one embodiment, at least one of the denesting assembly, transfers assembly or stacker assembly include one or more limit switches to inhibit movement of the postal tote beyond a desired maximum range of travel. In one embodiment, the system further includes a user interface.

In one embodiment, the system further includes a friction feeder having a centralized frame enabling easy in replacement of one or more friction belts, the centralized frame configured to support a plurality of axles operably coupled to friction feeder belt wheels positioned on either side of the centralized frame.

In one embodiment, the automated mail sorting system is modular, such that one or more roller assemblies, one or more lift assemblies, one or more pusher assemblies, one or more conveyor assemblies, or one or more elevator assemblies, each representing discrete components, can be added to the automated mail sorting system for improved customization.

Another embodiment of the present disclosure provides an automated mail sorting system, including a denesting assembly including one or more push contacts configured to selectively actuate between a neutral position and a denesting position, wherein in the denesting position the one or more push contacts squeeze an upper portion of a postal tote of a plurality of nested postal totes to ease in separation of the postal tote from the plurality of nested postal totes, a traverse assembly including one or more suction cups configured to selectively adhere to a surface of the postal tote to enable lifting of the postal tote from the plurality of nested postal totes, the traverse assembly further including a carriage configured to transport the postal tote along a lateral distance, a friction feeder configured to receive individual pieces of mail for delivery into a postal tote, and a stacker assembly including a tray configured to receive the postal tote from the traverse assembly, and a carriage configured to transport the postal tote past the feeder assembly for the positioning of individual pieces of mail within the postal tote.

Yet another embodiment of the present disclosure provides an automated mail sorting system configured to position individual pieces of mail in one of a plurality of nested postal totes, including a friction feeder having a centralized frame enabling easy in replacement of one or more friction belts, the centralized frame configured to support a plurality of axles operably coupled to friction feeder belt wheels positioned on either side of the centralized frame. Accordingly, embodiments, devices, systems, and methods are employed which can provide a friction feeder that can include of a variety of elements that can access components of the machine and increase adjustable options. Such devices, systems, and methods can receive envelopes and send them out as a single envelope at a time at high speed. Such devices, systems, and methods can receive envelopes from three sides, the back, left, and right. Orientation of the envelope can be adjusted prior and as needed.

Envelopes can be collected in a single stack on the machine and pulled one by one through a series of rollers, encountering two different speeds. For the attention to the high volume and frequent use of this kind of device, it has been acknowledged that the machine belts will need to be replaced during the life of the feeder. Prior feeders on the market traditionally mount the series of necessary rollers onto two side plates, increasing the time and difficulty to access and replace a single belt. Disclosed embodiments, however, can mount the rollers on a single center frame, leaving each end free to access. This can reduce the time of replacing a belt significantly.

According to embodiments, devices, systems, and methods, an adjustable feed angle can be employed, such that a feeder can be applied to many different applications and for increasing the options of mounting the overall machine. The last set of rollers can be freely mounted, supported by an adjustable air cylinder. The angle of rotation can be selected by the user, and changed by providing a simple command input. An envelope leaving this device can be ejected at high speeds in the direction selected, into another set of conveyors if desired, or to insert into trays or boxes. These end uses are not limited.

According to embodiments, devices, systems, and methods, a mail sorter can include an additional section of automation and increase in speed to the mass transportation of envelopes. Such devices, systems, and methods general purpose of the system can receive empty mail trays and return filled trays packed according to user-set parameters entered into the system.

A set of removable rollers can be mounted off to the side to hold stacks of a variety of mail trays. When indicated, an operator can push the stack onto the next set of rollers inside the frame. This area of the system can lift the stack as each tray is removed, introducing a new method of removing a single tray from the top of the stack. Air suction can be used to grip onto the top tray, and a set of air cylinders with fixtures on the end will keep the rest of the stack in place as a single tray is lifted.

Once a single tray is lifted, it can be brought to the next area of the system, the filling ramp, providing a distinctive new system that is a ramp at a steep angle to minimize the special footprint of the machine and to increase speed of filling. The trays can be moving in pace with the envelope feeder until identified as a completed tray.

The completed tray at the bottom of the ramp can be tipped to an inclined conveyor located underneath. This conveyor can bring the tray back out to the operator, where an identification tag provided by the machine can be placed on the front end of the tray.

The summary above is not intended to describe each illustrated embodiment or every implementation of the present disclosure. The figures and the detailed description that follow more particularly exemplify these embodiments.

BRIEF DESCRIPTION OF THE DRAWINGS

The disclosure can be more completely understood in consideration of the following detailed description of various embodiments of the disclosure, in connection with the accompanying drawings, in which.

While embodiments of the disclosure are amenable to various modifications and alternative forms, specifics thereof shown by way of example in the drawings will be described in detail. It should be understood, however, that the intention is not to limit the disclosure to the particular embodiments described. On the contrary, the intention is to cover all modifications, equivalents, and alternatives falling within the spirit and scope of the subject matter as defined by the claims.

DETAILED DESCRIPTION

Figure 1A:
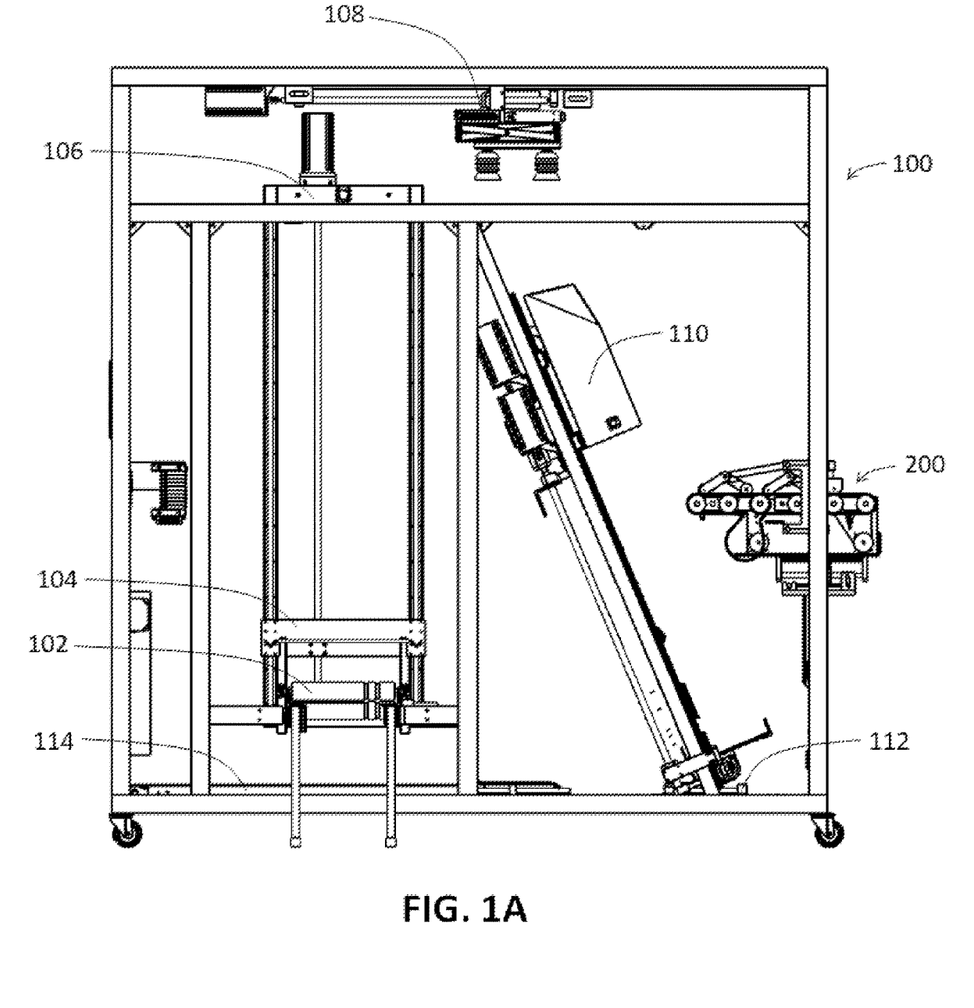
FIG. 1A is a profile view of an automated mail sorting system, in accordance with an embodiment of the disclosure.
Figure 1B:
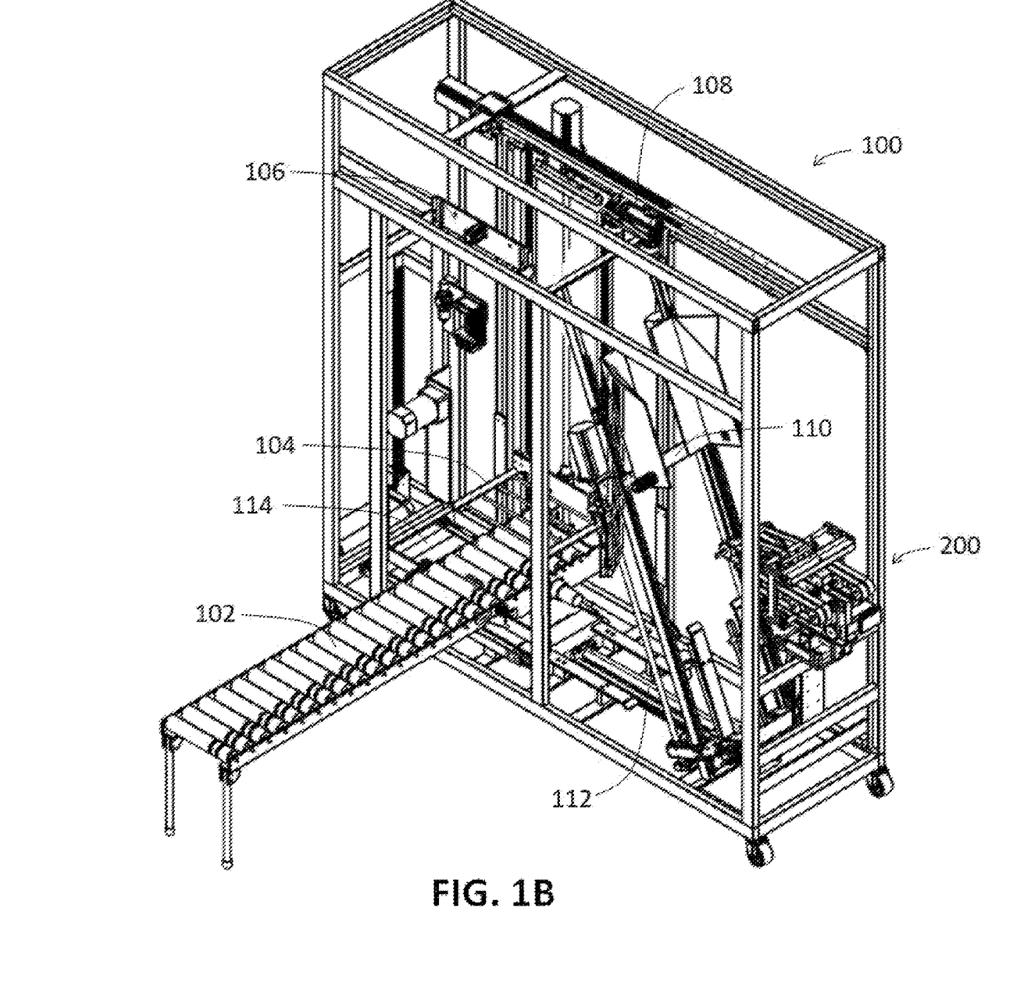
FIG. 1B is a perspective view of the automated mail sorting system of FIG. 1A, in accordance with an embodiment of the disclosure.

Referring to FIGS. 1A-B, an automated mail sorting system 100 configured to receive individual pieces of mail (e.g., direct mail advertisements, flyers, envelopes, catalogs, etc.) for sorting and/or otherwise organizing the individual pieces of mail into distinct groups contained in one or more postal service bins for ease in mailing, is depicted in accordance with an embodiment of the disclosure. As depicted, in some embodiments, the system 100 can include a roller assembly 102 configured to feed stacks of nestable postal totes into the automated mail sorting system 100. Thereafter, a lift assembly 104 can lift the individual stacks of nestable postal totes to an appropriate height for denesting by a denesting assembly 106. Thereafter, each postal tote can be transported via a traverse assembly 108 to a stacker assembly 110, individual pieces of mail can be loaded into the postal tote. For example, in one embodiment, a friction feeder 200 can be used to load individual pieces of mail into the postal tote. Once loaded, a pusher assembly 112 can assist in separating the loaded postal tote from the stacker assembly 110 for further transport along a conveyor assembly 114. In some embodiments, an optional elevator assembly 116 can be employed at the end of the conveyor assembly 114 to raise the loaded postal tote to a desired height for further handling.

Lift Assembly

Figure 2A:
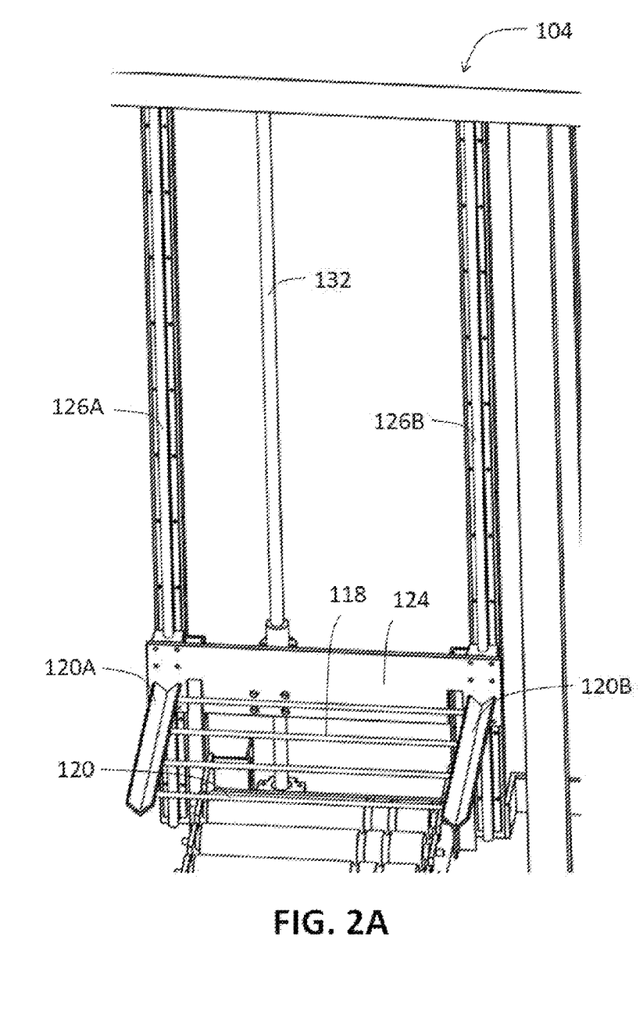
FIG. 2A is a close-up perspective view of a lift assembly, in accordance with an embodiment of the disclosure.
Figure 2B:
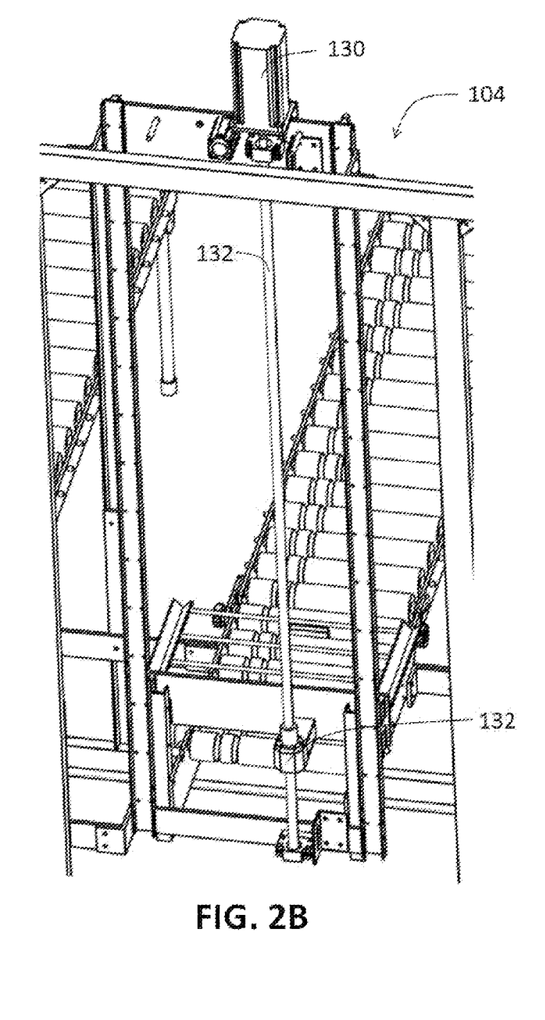
FIG. 2B is an alternate close-up perspective view of the lift assembly of FIG. 2A, in accordance with an embodiment of the disclosure.
Figure 8:
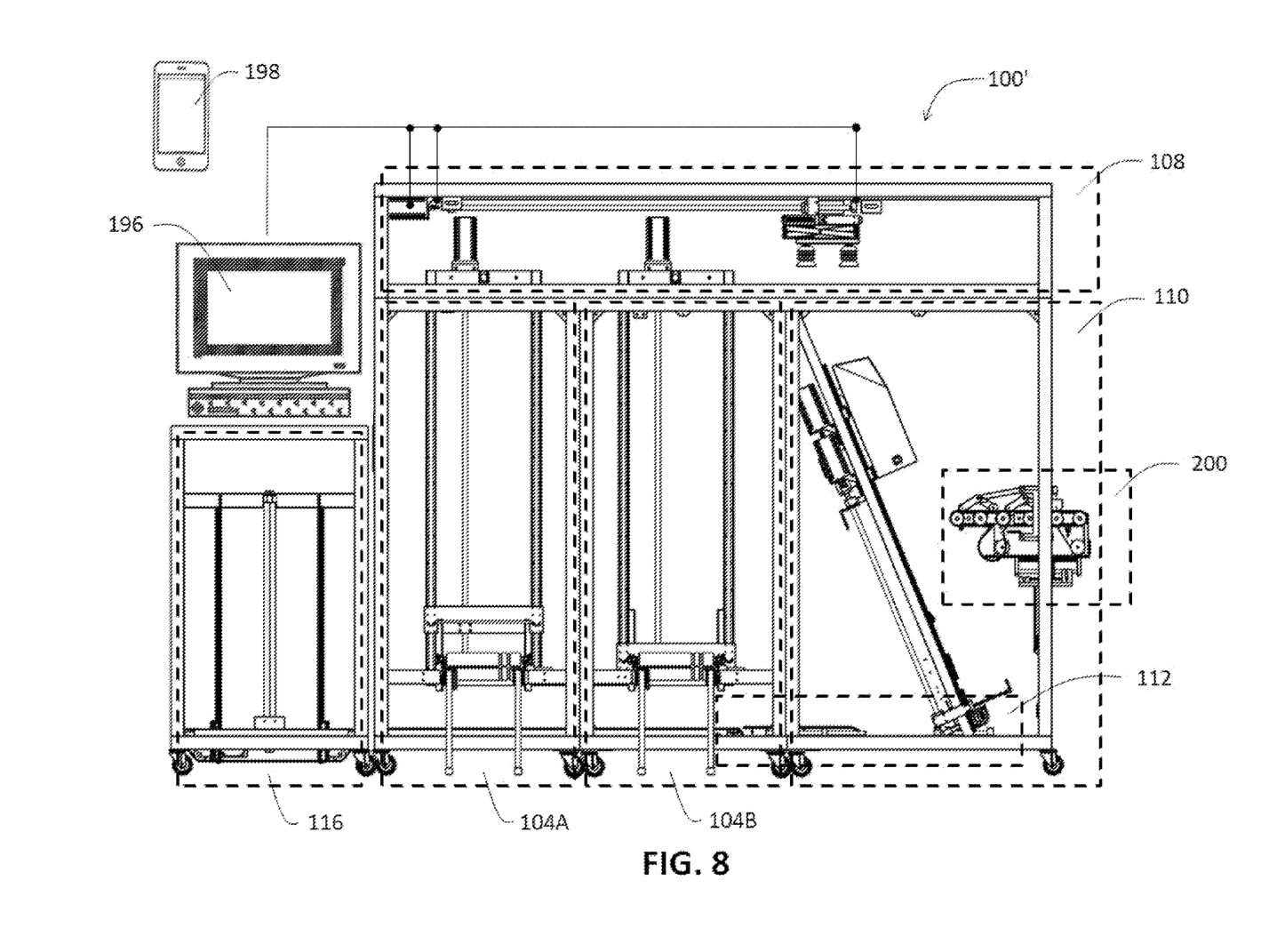
FIG. 8 is a profile view of a modular automated mail sorting system, in accordance with an embodiment of the disclosure.

With additional reference to FIGS. 2A-B, close up front and rear views of the lift assembly 104 are depicted in accordance with an embodiment of the disclosure. In some embodiments, the automated mail sorting system 100 can include multiple roller assemblies 102A-B and lift assemblies 104A-B (as depicted in FIG. 8), with each lift assembly 104A-B adapted to receive nestable postal totes of a particular size or range of sizes.

Nestable postal-style totes are typically constructed of a flat sheet of corrugated plastic material, wherein the sheet of corrugated plastic material is folded to form a five sided container typically defining one or more handgrips. Once folded, overlapping portions of the sheet of corrugated plastic material are spot fused or otherwise affixed together to form a completed tote. In some embodiments, a metal wire frame can employed along the top edge of the totes to provide added rigidity (e.g., the metal wire frame can be envelope in overlapping portions at the sheet of corrugated plastic material). Although generally rectangular, nestable postal-style totes are available in a wide variety of shapes and sizes. Embodiments of the present disclosure are configured to enable adaptation to receive and sort individual pieces of mail into nearly any nestable postal-style tote configuration.

In embodiments, individual postal totes or nested stacks of postal totes can be positioned on the roller assembly 102, to provide a supply of empty postal totes to the automated mail sorting system 100. In some embodiments, the roller assembly 102 can be actively powered, for example, by one or more motors. For example, in some embodiments, activation of the roller assembly 102 (or portions of the roller assembly 102) can be coordinated with movement of the lift assembly 104, thereby enabling a portion of the lift assembly 104 to be positioned under an incoming postal tote as the postal totes are fed into the system 100. In other embodiments, the roller assembly 102 can be passive in nature, such that the empty postal totes can be urged along the roller assembly 102 by an external force (e.g., manually, under the force of gravity, etc.). Other types of conveyors or feeder assemblies configured to supply empty postal totes to the system 100 are also contemplated.

As depicted in FIGS. 2A-B, in some embodiments, the lift assembly 104 can include lifting fork 118 including one or more times 120A-B, which in some embodiments can straddle either side of the roller assembly 102, thereby enabling portions of the lifting fork 118 to be positioned at the same height or below a height of the roller assembly 102. One or more optional cross-ties 122 can provide support between the support tines 120A-B, thereby providing a larger supporting surface.

The lifting fork 118 can be operably coupled to a carriage 124, which can be slidably coupled to one or more one or more tracks 126A-B, thereby enabling vertical movement of the carriage 124 relative to the roller assembly 102. In some embodiments, movement of the carriage 124 can be actuated by a motor 128. For example, in some embodiments, the motor 128 can be configured to rotate a threaded shaft 130, such that rotation of the threaded shaft 130 causes a nut 132 fixedly coupled to the carriage 124 to traverse vertically along the threaded shaft, thereby enabling the carriage 124 and lifting fork 118 to be raised and lowered relative to the roller assembly 102.

In some embodiments, the motor can include a rotary encoder configured to track rotation of the threaded shaft 130, which in turn enables the system 100 to determine a vertical height of the carriage 124 relative to other portions of the system 100. Alternatively, or as a backup to the rotator encoder, in some embodiments, the system 100 can include one or more sensors inductance sensor, optical sensor, limit switch, etc.) configured to serve as a stop switch to limit an maximum upward and/or downward travel of the carriage 124 along the one or more tracks 126A/B. Other configurations of the lift assembly 104 are also contemplated.

Denesting Assembly

Figure 3:
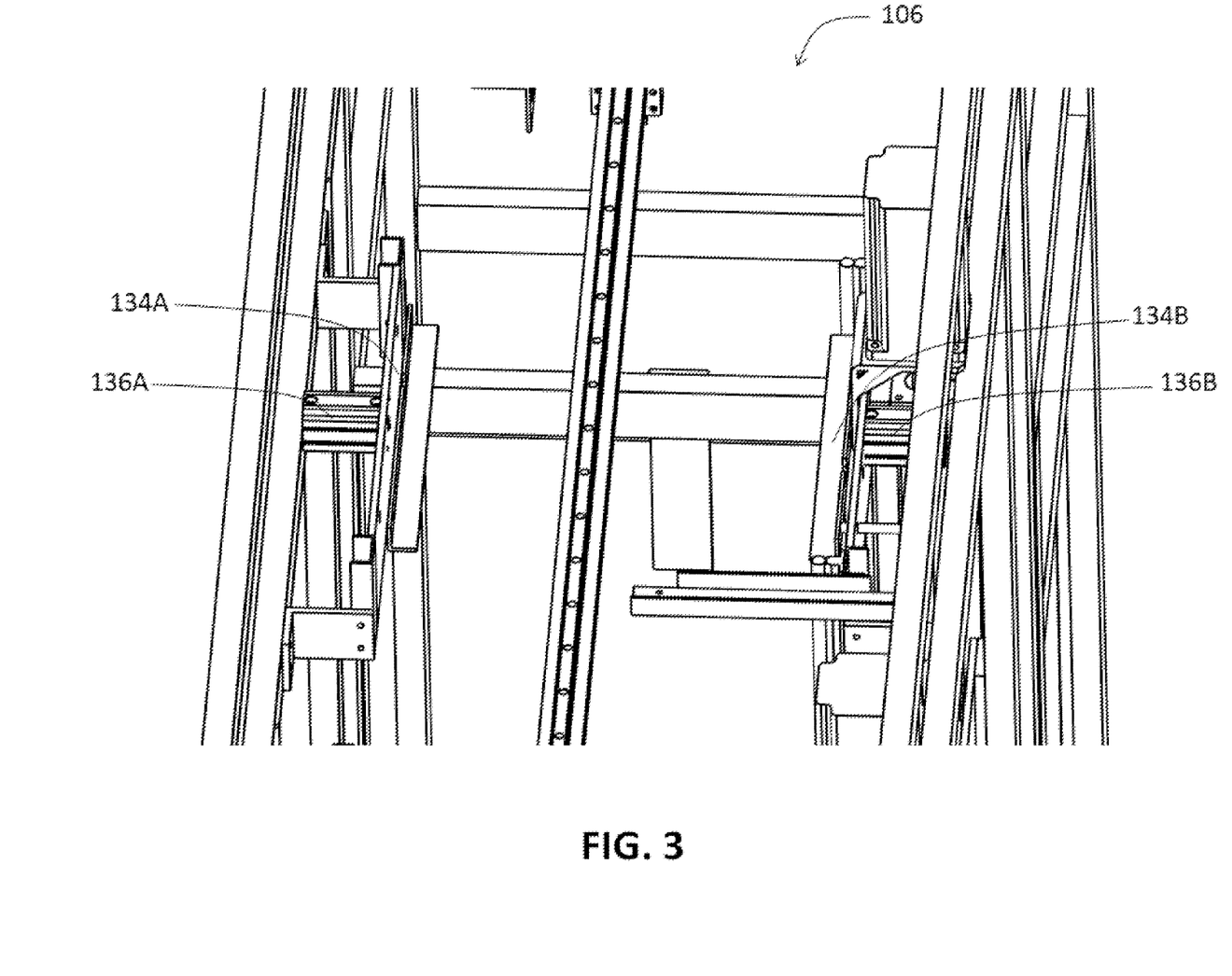
FIG. 3 is a close-up perspective view of a denesting assembly, in accordance with an embodiment of the disclosure.

With additional reference to FIG. 3, a close-up view of the denesting assembly 106 is depicted in accordance with an embodiment of the disclosure. In embodiments, the lift assembly 104 can be configured to raise a top portion of the top postal tote in a stack of nested postal totes into a position where portions of the denesting assembly 106 can push against opposing sides of the top postal tote (e.g., effectively squeezing the sides of the postal tote together), thereby enabling the postal totes to be more easily separated or denested from one another.

In particular, postal totes have a tendency to resist separation when in a nested configuration. To ease in separation of the postal totes from one another, Applicant of the present disclosure has found that applying pressure to opposing sides of the top postal tote enables the top postal tote to be temporarily deformed, thereby reducing surface area contact between nested postal totes in some areas, and increasing a denesting/pushing force between nested postal totes in other areas. To achieve this effect, embodiments of the present disclosure can include opposing push contacts 134A-B, which can selectively actuate between a neutral and denesting position via a corresponding pair of actuators 136A-B. To accommodate a variety of sizes of postal totes, a distance that the opposing push contacts 134A-B move (e.g., a distance between the neutral and denesting position) can be controlled by the pair of actuators 136A-B.

In some embodiments, particularly where a standard size postal tote is used, that denesting assembly 106 can include one or more ramps configured to naturally push or deform opposing sides of the top postal tote inwardly as the top postal tote is raised by the lift assembly 104. Accordingly, rather than using brute force to separate the nested postal totes, embodiments of the present disclosure are configured to enable a combination of a squeezing force with a lifting force (provided by the traverse assembly 108) to separate nested postal totes.

Traverse Assembly

Figure 4:
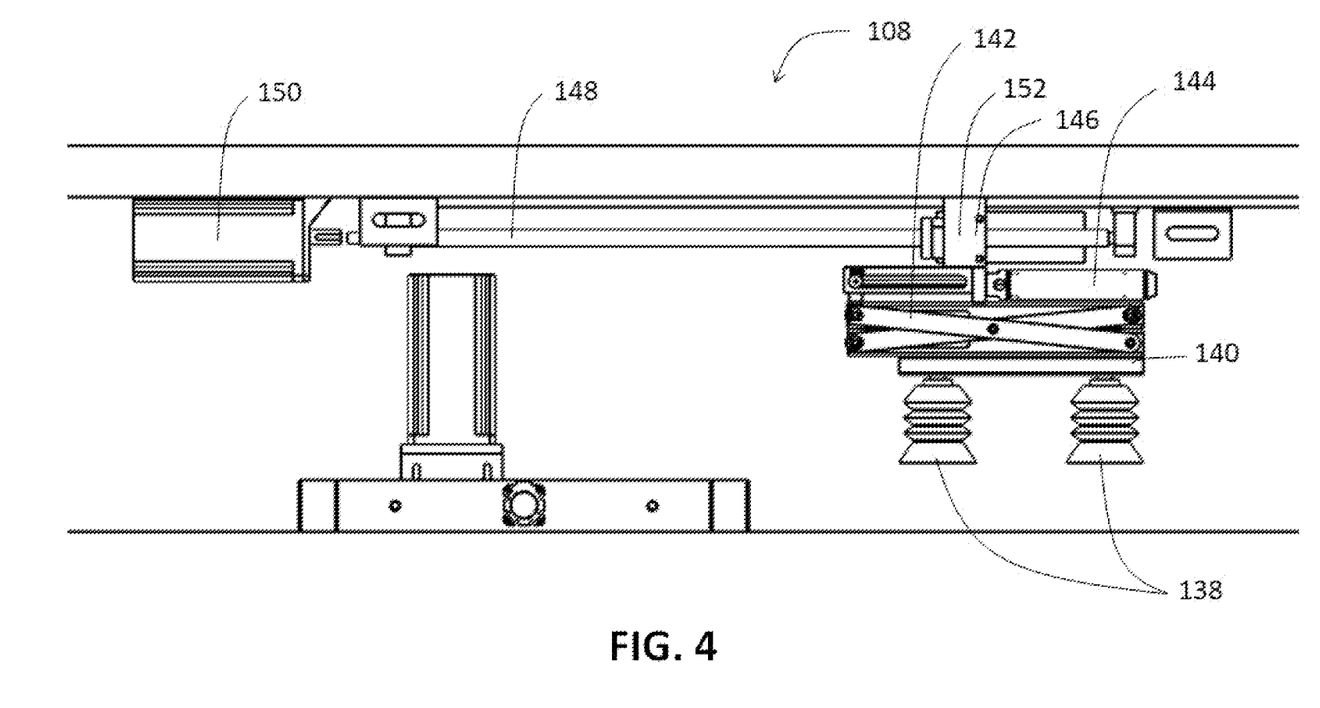
FIG. 4 is a close-up, profile view of a transverse assembly, in accordance with an embodiment of the disclosure.

With additional reference to FIG. 4, a close-up view of the traverse assembly 108 is depicted in accordance with an embodiment of the disclosure. In embodiments, the traverse assembly 108 (in combination with the denesting assembly 106) is configured to separate a postal tote from a stack of postal totes for transportation to a stacker assembly 110 where individual pieces of mail can be loaded into the postal tote.

In embodiments, the traverse assembly 108 can include one or more suction cups 138A/B, which in some embodiments can be actively powered by a pneumatic vacuum source. The one or more suction cups 138A/B can be raised and lowered relative to denesting assembly 106 via a scissors jack 142, which can be selectively actuated via an actuation motor 144, thereby enabling the one or more suction cups 138A/B to be moved into contact with a top postal tote in a stack of nested postal totes as the scissors jack 142 extends, thereby enabling the one or more suction cups 138A/B to temporarily adhere to a surface of the top postal tote. Upon contraction of the scissors jack 142, continued adherence of the one or more suction cups 138A/B to the surface of the top postal tote enables separation of the top postal tote from the nested stack of postal totes.

In embodiments, the scissors jack 142 can be operably coupled to a carriage 146 configured to slide or otherwise translate along a threaded rod 148. For example, in one embodiment, a motor 150 can be configured to rotate the threaded rod 148, while a stationary nut 152 operably coupled to the scissors jack 142 transmits a translating force to the scissors jack 142, thereby enabling the scissors jack 142 to traverse laterally across a portion of the system 100. Other modes of translation, including a carriage and track system are also contemplated. In some embodiments, both a threaded rod and a track system can be used to affect transverse movement.

In some embodiments, the motor 150 can include a rotary encoder configured to track rotation of the threaded rod 148, which in turn enables the system 100 to determine a position of the carriage 146 relative to other portions of the system TOO. Alternatively, or as a backup to the rotary encoder, in some embodiments, the system 100 can include one or more sensors (e.g., inductance sensor, optical sensor, limit switch, etc.) configured to serve as a stop switch to limit an maximum travel of the carriage 146 along the threaded rod 148. Other configurations of the traverse assembly 108 are also contemplated.

Stacker Assembly

Figure 5:
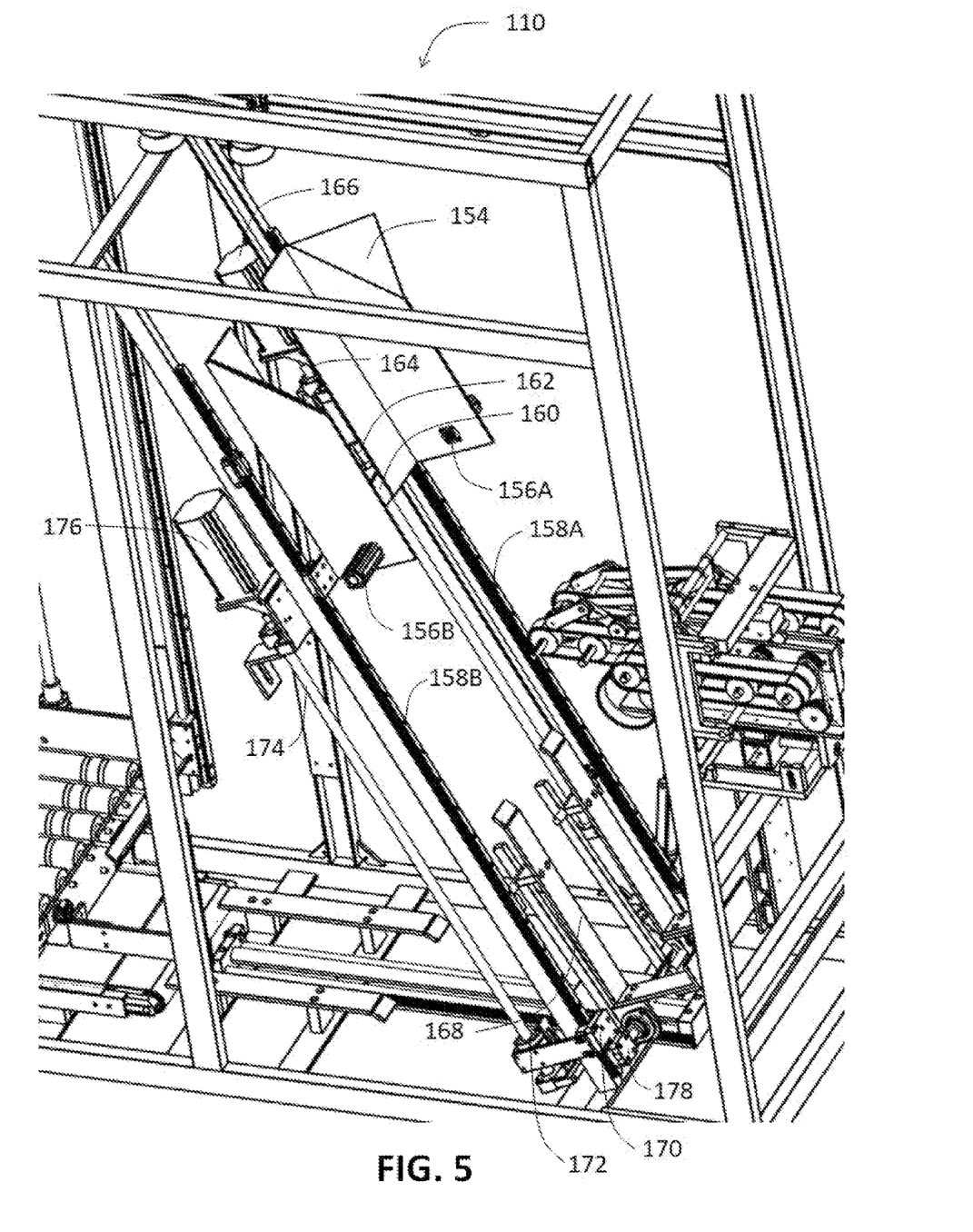
FIG. 5 is a close-up perspective view of a stacker assembly, in accordance with an embodiment of the disclosure.

With additional reference to FIG. 5, a close-up view of the stacker assembly 110 (occasionally referred to herein as the "Bishop assembly") is depicted in accordance with an embodiment of the disclosure. In embodiments, the stacker assembly 110 is configured to orient a postal tote relative to the friction feeder 200, to enable the postal tote to be selectively filled with one or more individual pieces of mail.

In embodiments, the stacker assembly 110 can include an upper tray 154 configured to receive a postal tote released by the one or more suction cups 138A/B of the traverse assembly 108. For example, once the postal tote is positioned above the upper tray 154, the pneumatic vacuum source of the traverse assembly 108 can be temporarily paused, thereby enabling the postal tote carried by the traverse assembly to naturally fall under the force of gravity into the upper tray 154. In some embodiments, one or more upper tray grips 156A/B positioned along the upper tray 154 can be actuated between a grip position configured to apply a gripping force to secure the postal tote within the upper tray 154, and a release position configured to enable the postal tote to be easily removed from the upper tray 154.

Once positioned in the upper tray 154, the postal tote can be translated along one or more tracks 158A/B, for example in a controlled motion past the friction feeder 200, thereby enabling individual pieces of mail to be positioned within the postal tote. For example, in one embodiment, the upper tray 154 can be operably coupled to a carriage 160 which can include a fixed nut 162 mounted on a threaded rod 164 which can be selectively rotated by a motor 166, thereby enabling the carriage 160/upper tray 154 to translate along the one or more tracks 158A/B in a slow and controlled manner.

In some embodiments, the motor 166 can include a rotary encoder configured to track rotation of the threaded rod 164, which in turn enables the system 100 to determine a position of the upper tray 154 relative to other portions of the system 100. Alternatively, or as a backup to the rotary encoder, in some embodiments, the system 100 can include one or more sensors (e.g., inductance sensor, optical sensor, limit switch, etc.) configured to serve as a stop switch to limit a maximum travel of the upper tray 154 along the threaded rod 164.

In some embodiments, the postal tote tray 154, grips 156A/B, carriage 160 and associated motive mechanism (e.g., nut 162, threaded rod 164, and motor 166) can be collectively referred to as the "upper stacker assembly." Thereafter, the postal tote (which can be at least partially loaded with individual pieces of mail via the friction feeder 200) can be transferred to a "lower stacker assembly") configured to continue translation of the postal tote along the one or more tracks 158A/B, and to pivot the loaded postal tote into a horizontal position for further processing. For example, in one embodiment, transfer of the postal tote from the upper stacker assembly to the lower stacker assembly can be accomplished through release of the one or more upper tray grips 156A/B (e.g., movement to the release position), thereby enabling the postal tote to drop under the force of gravity into a lower tray 168. In embodiments, the lower tray 168 can be operably coupled to the one or more tracks 158A/B via a carriage 170 which can include a fixed nut 172 mounted on a threaded rod 174 which can be selectively rotated by a motor 176, thereby enabling the carriage 170/lower tray 168 to continue to translate along the one or more tracks 158A/B in a slow and controlled manner.

In some embodiments, the motor 176 can include a rotary encoder configured to track rotation of the threaded rod 174, which in turn enables the system 100 to determine a position of the lower tray 168 relative to other portions of the system 100. Alternatively, or as a backup to the rotary encoder, in some embodiments, the system 100 can include one or more sensors inductance sensor, optical sensor, limit switch, etc.) configured to serve as a stop switch to limit an maximum travel of the lower tray 168 along the threaded rod 174.

Once the lower tray 168 has reached a desired position along the one or more tracks 158A/B, further translation can be paused (e.g., via motor 176). Thereafter, the lower tray 168 can be pivoted relative to the carriage 170 from a first orientation having a longitudinal axis substantially aligned with the one or more tracks 158A/B to a substantially horizontal second orientation. For example, in one embodiment, one or more motors 178 can operably couple the lower tray 168 to the carriage 170, such that when activated, the one or more motors 178 pivot the lower tray 168 from the first orientation to the second orientation, and vice versa.

In some embodiments, the motor 178 can include a rotary encoder configured to track rotation of the motor 178, which in turn enables the system 100 to determine a pivot position of the lower tray 168. Alternatively, or as a backup to the rotary encoder, in some embodiments, the system 100 can include one or more sensors (e.g., inductance sensor, optical sensor, limit switch, etc.) configured to serve as a stop switch to limit an maximum travel of the lower tray 168 along relative to other portions of the system 100.

Pusher Assembly

Figure 6:
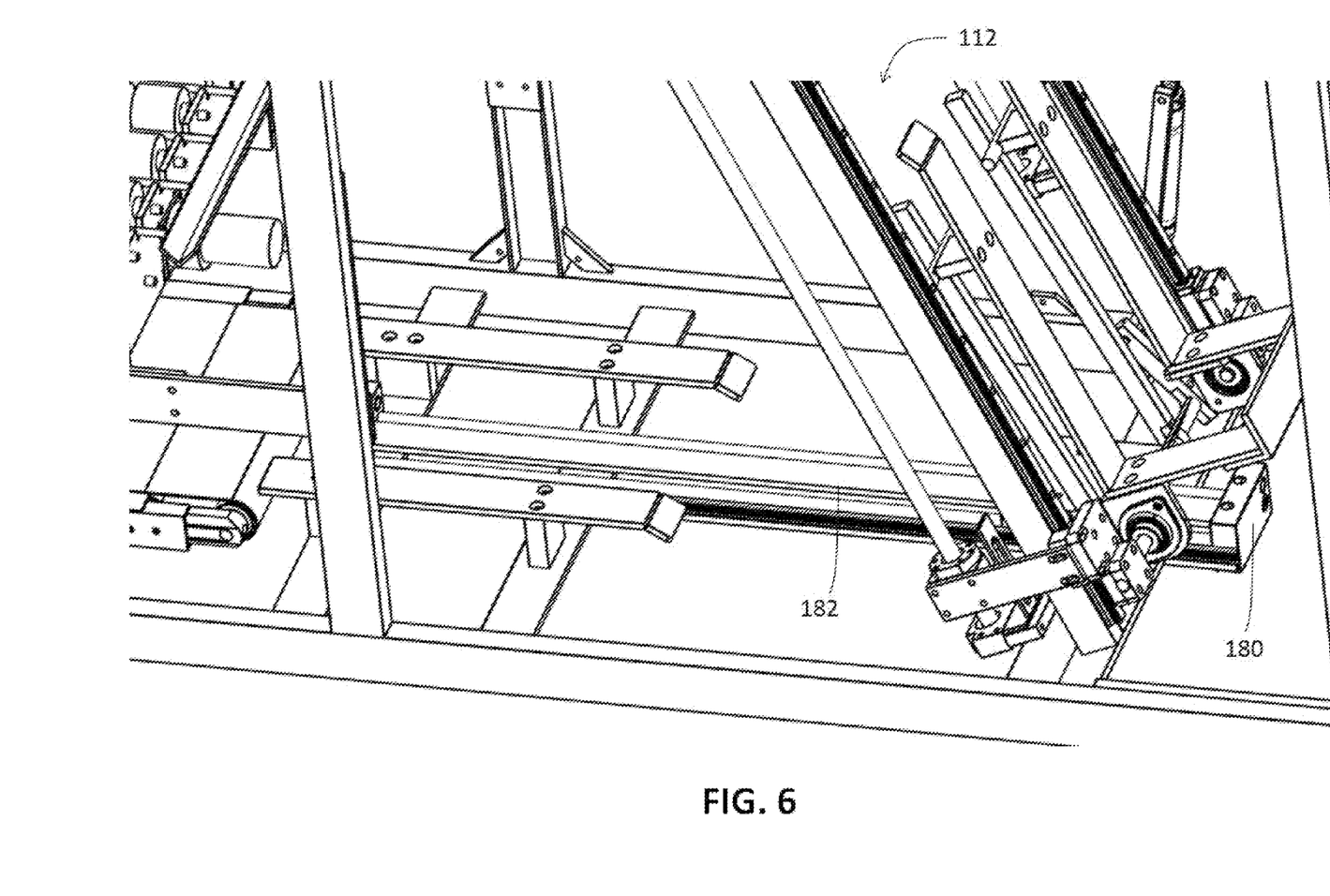
FIG. 6 is a close-up perspective view of a pusher assembly, in accordance with an embodiment of the disclosure.

With additional reference to FIG. 6, a close-up view of the pusher assembly 112 is depicted in accordance with an embodiment of the disclosure. In embodiments, the pusher assembly 112 is configured to move a postal tote loaded with individual pieces of mail from the stacker assembly 110 to the conveyor assembly 114, for further processing.

In embodiments, the pusher assembly 112 can include a tote engaging member 180 configured to engage with a surface of the postal tote loaded in the lower tray 168. For example, in some embodiments, the lower tray 168 can define an opening through which the tote engaging member 180 can selectively pass. The tote engaging member 180 can be operably slidably coupled to a track 182, thereby enabling the tote engaging member 180 to translate substantially horizontally along the track 182, thereby pushing the loaded mail tote from the stacker assembly 110 to the conveyor assembly 114. In some embodiments, the tote engaging member 180 can be translated along the track 182 via an actuation motor, threaded rod and fixed nut; although other modes of operation and actuation are also contemplated.

The conveyor assembly 114 can be any conventional conveyor configured to move the loaded postal tote relative to the system 100 for further processing. For example, in some embodiments, the conveyor assembly 114 can include a driven belt, a series of rollers, or the like.

Optional Elevator Assembly

Figure 7:
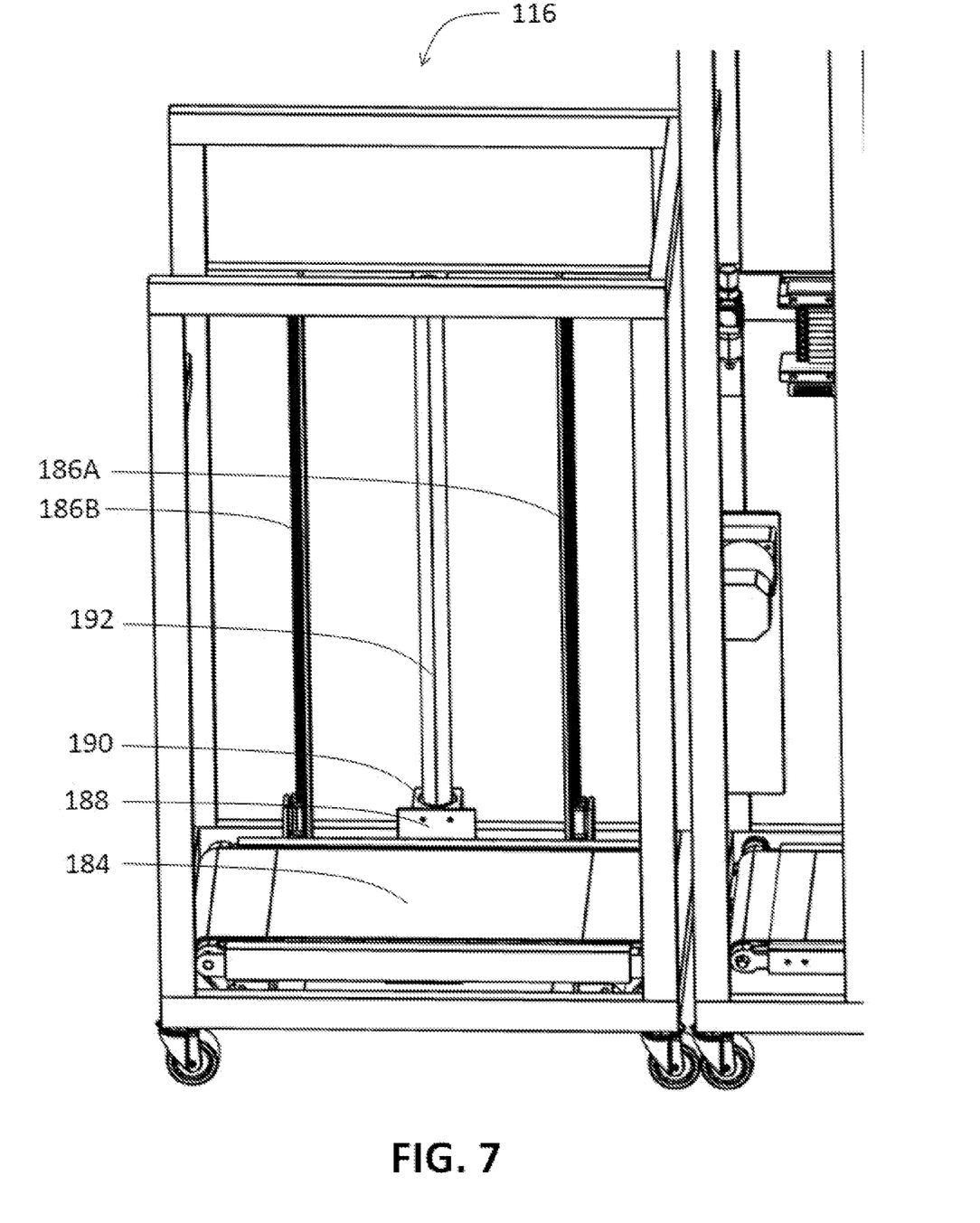
FIG. 7 is a close-up perspective view of an optional elevator assembly, in accordance with embodiments of the disclosure.

With additional reference to FIG. 7, a close-up view of the optional elevator assembly 116 is depicted in accordance with an embodiment of the disclosure. In embodiments, the elevator assembly 116 is configured to lift the postal tote in a vertical direction to a desired height for further processing.

In embodiments, the elevator assembly 116 can include a conveyer mechanism 184 configured to move a postal tote in a substantially horizontal direction, for example to receive a postal tote from the conveyor assembly 114, such that a center of gravity of the postal tote is substantially positioned above the conveyor mechanism 184 to ensure that the postal tote does not fall off the conveyor mechanism 184 during elevation. Thereafter, the conveyor mechanism 184 can translate along one or more tracks 186A/B from a first vertical position to a second vertical position. In some embodiments, the conveyor mechanism 184 can be operably coupled to a carriage 188 which can include a fixed nut 190 mounted on a threaded rod 192 which can be selectively rotated by a motor 194, thereby enabling the carriage 188/conveyor mechanism 184 to translate along the one or more tracks 186A/B from the first vertical position to the second vertical position and vice versa.

In some embodiments, the motor 194 can include a rotary encoder configured to track rotation of the threaded rod 192, which in turn enables the system 100 to determine a position of the carriage 188 relative to other portions of the system 100. Alternatively, or as a backup to the rotary encoder, in some embodiments, the system 100 can include one or more sensors e.g., inductance sensor, optical sensor, limit switch, etc) configured to serve as a stop switch to limit an maximum travel of the carriage 188 along the threaded rod 192. Other configurations of the elevator assembly 116 are also contemplated.

Modularity

With additional reference to FIG. 8, a profile view of a modular automated mail sorting system 100 is depicted in accordance with an embodiment of the disclosure. In such an embodiment, the individual subassemblies (e.g., roller assembly 102, lift assembly 104, the nesting assembly 106, traverse assembly 108, stacker assembly 110, pusher assembly 112, conveyor assembly 114, elevator assembly 116, etc.) can exist as standalone components configured to be assembled to form a completed automated mail sorting system 100, thereby enabling ease in customization of automated mail sorting systems to meet the needs of a variety of end users, whether that be adapting the system 100 to fit within the confines of a small room, or to adapt the system 100 to a large operation potentially utilizing multiple stacker assemblies and friction feeders simultaneously.

Automation and User Interface

In embodiments, the various motors and actuators used herein can employ rotary encoders configured to track rotation and/or actuation of the motors and actuators to determine a position of various components of the system 100 during operation. Alternatively, or as a backup to the rotary encoder, in some embodiments, the system can include one or more sensors inductance sensor, optical sensor, limit switch, etc.) configured to serve as a stop switch to limit an maximum travel (e.g., rotation, actuation, etc.) during operation.

Embodiments of the present disclosure can be operably coupled to a user interface 196 adapted to enable user control of the various system components, including rotation of the various motors and actuation of the various actuators, as well as identifying positions of switches, gathering rotary encoder information, and the like. In some embodiments, the user interface 196 can be in the form of a stationary display and computer system. In other embodiments, the system 100 can be configured to wirelessly communicate with one or more mobile computing devices 198, thereby enabling the one or more mobile computing devices to serve as the user interface.

Friction Feeder

Figure 9A:
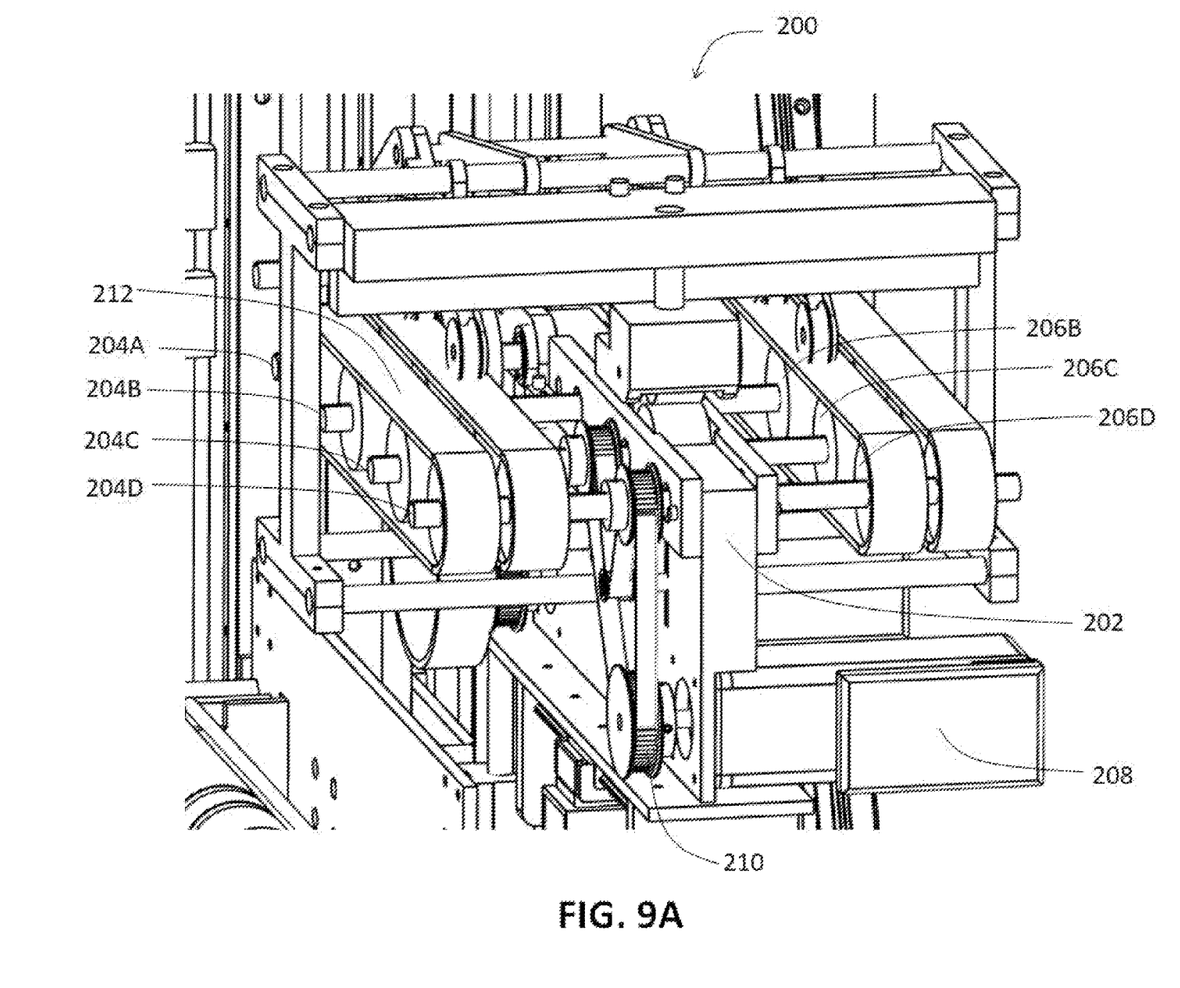
FIG. 9A is a close-up perspective view of a friction feeder, in accordance with an embodiment of the disclosure.
Figure 9B:
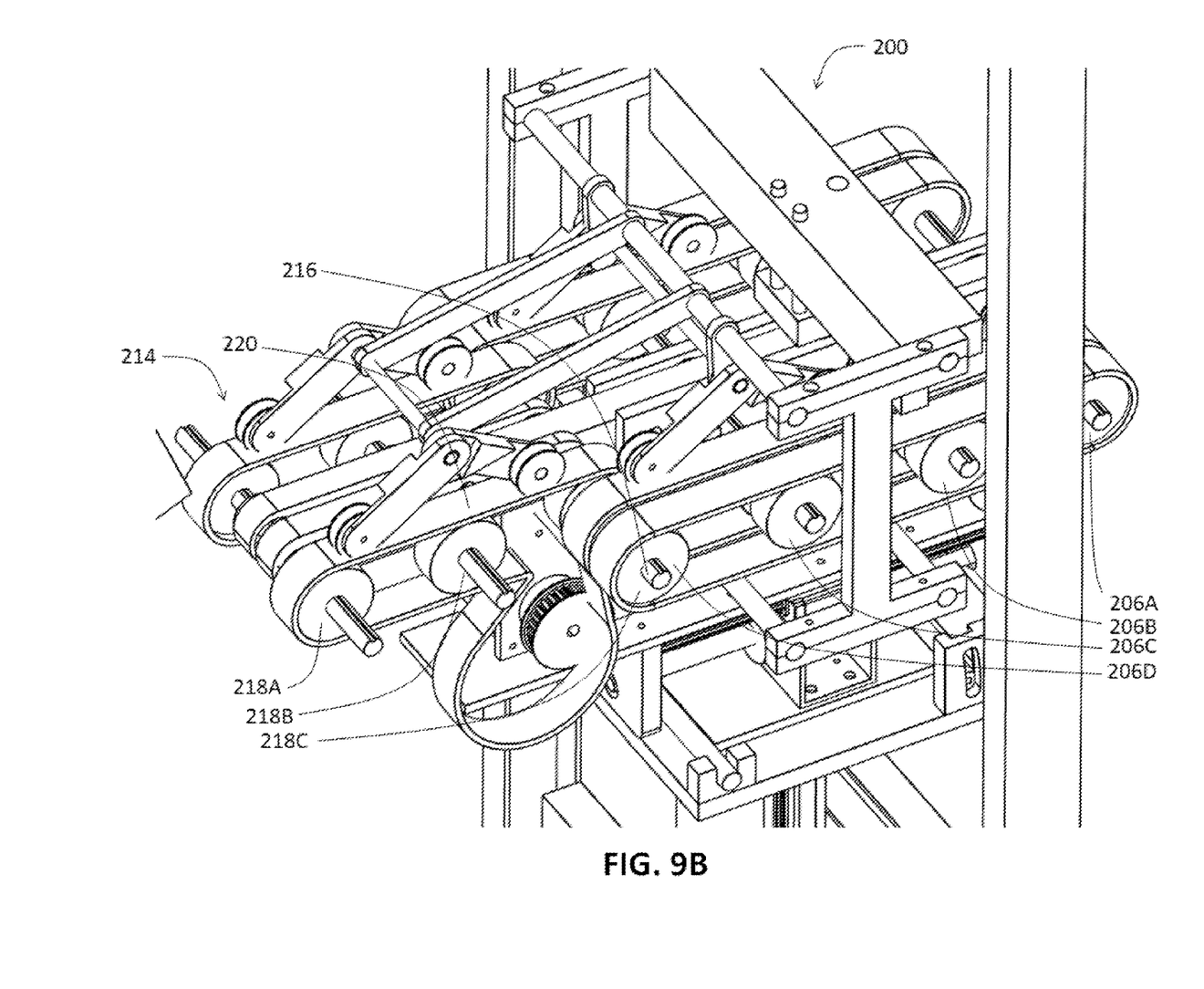
FIG. 9B is an alternate close-up perspective view of the friction feeder of FIG. 9A, in accordance with an embodiment of the disclosure.
Figure 9C:
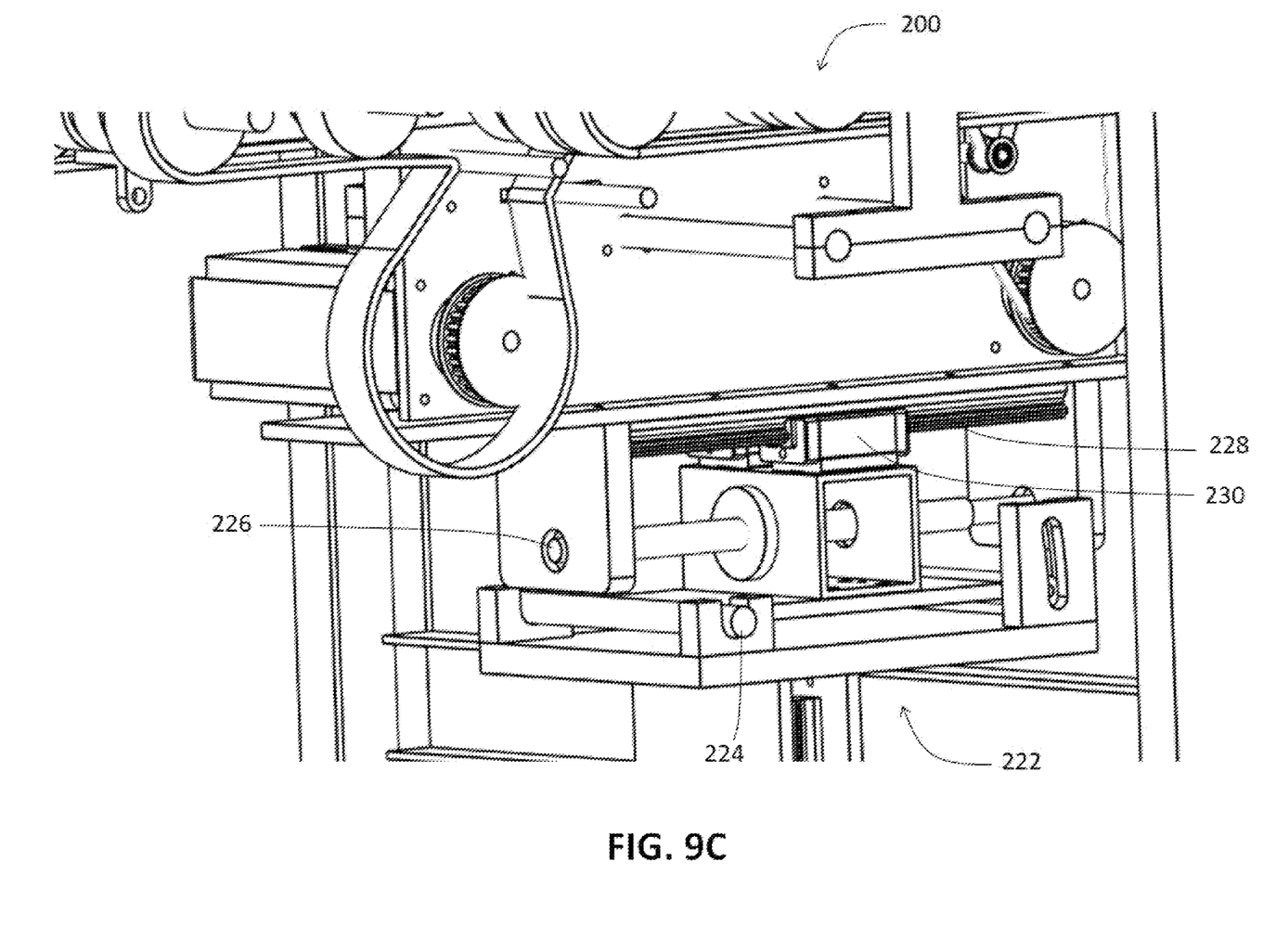
FIG. 9C is a close-up perspective view of a positional adjustment mechanism of a friction feeder, in accordance with an embodiment of the disclosure.

With additional reference to FIGS. 9A-C, a friction feeder 200 is depicted in accordance with an embodiment of the disclosure. In embodiments, the friction feeder 200 can be configured to feed individual pieces of mail (e.g., from an output of a printer) into empty postal totes. Although friction feeders generally, are known in the art, it has been recognize that the changing of friction belts on conventional friction feeders can be a tedious and time-consuming event. From time to time the friction belts on a friction feeder may wear out, break or otherwise need replacement. As part of the belt replacement process, typically the friction feeder must be removed from the larger assembly and at least partially disassembled from an external frame in order to install the new friction belts. Applicant of the present disclosure has addressed this problem through the use of a centralized frame 202, thereby enabling rapid replacement of friction belts without the need to remove the friction feeder 200 from the system 100, as well as to remove the need to at least partially disassemble the friction feeder 200 in order to install the replacement friction belts.

In embodiments, the central frame 202 can be configured to retain a series of axles 204 operably coupled to friction feeder belt wheels 206A-D. A motor 208 can be operably coupled to one or more of the axles 204 via a drive belt 210. One or more friction belts 212 can be selectively mounted on the wheels 206A-D. For example, in one embodiment, opposing sides of the friction feeder 200 can include a total of four wheels 206A-D (or sets of wheels) configured to receive a pair of drive belts 210A-B. As depicted in FIGS. 9A-B, in embodiments, the drive belts 210A-B can be selectively replaced by slipping the belt over a distal end of the wheels 206A-D, thereby presenting a significant time and labor savings in belt replacement over conventional designs.

Accordingly, embodiments of the friction feeder 200 enable individual pieces of mail (e.g., from an output of the printer) to be gripped for placement into a postal tote. In some embodiments, the friction feeder 200 can further include an accelerator portion 214, configured to accelerate a speed of the individual pieces of mail, thereby increasing a gap distance between the individual pieces of mail within the friction feeder 200. In embodiments, the accelerator portion 212 can be pivotably coupled to the central frame 202, for example via one axle 216 of a multi-wheel 218A-C assembly, thereby feeding of the individual pieces of mail to be vectored for greater control in positioning of the individual pieces of mail within the postal tote. Like the friction feeder belts 212, one or more friction belts 220 of the accelerator portion 214 can be selectively replaced by slipping the belt over a distal end of the wheels 218A-C, thereby presenting a significant time and labor savings in belt replacement over conventional designs.

With additional reference to FIG. 9C, in some embodiments, the friction feeder 200 can be operably coupled to the system 100 via a positional adjustment mechanism 222 configured to enable precise adjustment of the feeding of individual pieces of mail into empty postal totes. For example, in one embodiment, the positional adjustment mechanism 222 can include a first pivot 224 configured to enable pivoting adjustment of the friction feeder 200 relative to the stacker assembly 110 along a first axis, and a second pivot 226 configured to enable pivoting adjustment of the friction feeder 200 relative to the stacker assembly 110 along a second axis. In some embodiments, the positional adjustment mechanism 222 can include a track 228 and slider 230 mechanism configured to enable positional adjustment of the friction feeder 200 relative to the stacker assembly 110, thereby enabling an output of the friction feeder 200 to be positioned closer to or further away from the postal totes carried by the stacker assembly 110. Other configurations of the positional adjustment mechanism 222 are also contemplated.

Accordingly, embodiments of the present disclosure enable individual pieces of mail (e.g., direct mail advertisements, flyers, envelopes, catalogs, etc.) from the output of a printer to be organized into distinct groups to be stored in a plurality of postal totes for ease in handling. Embodiments of the present disclosure are designed for ease-of-use, as well as to reduce the repetitive labor naturally associated with the acts of gathering printed mail and organizing it into separate postal totes.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. An automated mail sorting system configured to position individual pieces of mail in one of a plurality of nested postal totes, the automated mail sorting system comprising:
   a denesting assembly including one or more push contacts configured to selectively actuate between a neutral position and a denesting position, wherein in the denesting position the one or more push contacts squeeze an upper portion of a postal tote of a plurality of nested postal totes to ease in separation of the postal tote from the plurality of nested postal totes;
   a traverse assembly including one or more suction cups configured to selectively adhere to a surface of the postal tote to enable lifting of the postal tote from the plurality of nested postal totes, the traverse assembly further including a carriage configured to transport the postal tote along a lateral distance; and
   a stacker assembly including a tray configured to receive the postal tote from the traverse assembly, and a carriage configured to transport the postal tote past a feeder assembly for the positioning of individual pieces of mail within the postal tote.

2. The automated mail sorting system of claim 1, further comprising one or more roller assemblies configured to transport a plurality of nested postal totes to at least one of a lift assembly or the denesting assembly.

3. The automated mail sorting system of claim 1, further comprising one or more lift assembly configured to vertically lift a plurality of nested postal totes to a desired height for access by the denesting assembly.

4. The automated mail sorting system of claim 1, further comprising a pusher assembly configured to transport the postal tote from the stacker assembly to a conveyor assembly for further processing.

5. The automated mail sorting system of claim 1, wherein at least one of the denesting assembly, transfers assembly or stacker assembly includes a motor with rotary encoding capabilities.

6. The automated mail sorting system of claim 1, wherein at least one of the denesting assembly, transfers assembly or stacker assembly include one or more limit switches to inhibit movement of the postal tote beyond a desired maximum range of travel.

7. The automated mail sorting system of claim 1, further comprising a user interface.

8. The automated mail sorting system of claim 1, further comprising a friction feeder having a centralized frame enabling easy in replacement of one or more friction belts, the centralized frame configured to support a plurality of axles operably coupled to friction feeder belt wheels positioned on either side of the centralized frame.

9. The automated mail sorting system of claim 8, wherein the friction feeder comprises a centralized frame enabling easy in replacement of one or more friction belts, the centralized frame configured to support a plurality of axles operably coupled to friction feeder belt wheels positioned on either side of the centralized frame.

10. The automated mail sorting system of claim 8, further comprising one or more roller assemblies configured to transport a plurality of nested postal totes to at least one of a lift assembly or the denesting assembly.

11. The automated mail sorting system of claim 8, further comprising one or more lift assembly configured to vertically lift a plurality of nested postal totes to a desired height for access by the denesting assembly.

12. The automated mail sorting system of claim 8, further comprising a pusher assembly configured to transport the postal tote from the stacker assembly to a conveyor assembly for further processing.

13. The automated mail sorting system of claim 8, wherein at least one of the denesting assembly, transfers assembly or stacker assembly includes a motor with rotary encoding capabilities.

14. The automated mail sorting system of claim 8, wherein at least one of the denesting assembly, transfers assembly or stacker assembly include one or more limit switches to inhibit movement of the postal tote beyond a desired maximum range of travel.

15. The automated mail sorting system of claim 8, further comprising a user interface.

16. The automated mail sorting system of claim 15, wherein the user interface is a mobile computing device.

17. The automated mail sorting system of claim 8, wherein the automated mail sorting system is modular, such that one or more roller assemblies, one or more lift assemblies, one or more pusher assemblies, one or more conveyor assemblies, or one or more elevator assemblies, each representing discrete components, can be added to the automated mail sorting system for improved customization.

18. The automated mail sorting system of claim 1, wherein the automated mail sorting system is modular, such that one or more roller assemblies, one or more lift assemblies, one or more pusher assemblies, one or more conveyor assemblies, or one or more elevator assemblies, each representing discrete components, can be added to the automated mail sorting system for improved customization.

19. An automated mail sorting system, comprising:
a denesting assembly including one or more push contacts configured to selectively actuate between a neutral position and a denesting position, wherein in the denesting position the one or more push contacts squeeze an upper portion of a postal tote of a plurality of nested postal totes to ease in separation of the postal tote from the plurality of nested postal totes;
a traverse assembly including one or more suction cups configured to selectively adhere to a surface of the postal tote to enable lifting of the postal tote from the plurality of nested postal totes, the traverse assembly further including a carriage configured to transport the postal tote along a lateral distance;
a friction feeder configured to receive individual pieces of mail for delivery into a postal tote; and
a stacker assembly including a tray configured to receive the postal tote from the traverse assembly, and a carriage configured to transport the postal tote past the feeder assembly for the positioning of individual pieces of mail within the postal tote.

* * * * *